United States Patent [19]
Sherer et al.

[11] Patent Number: 5,369,255
[45] Date of Patent: Nov. 29, 1994

[54] COMBINED MICROWAVE UNIT AND FOOD CARRIER

[76] Inventors: Shane Sherer; Darla J. Sherer, both of Hilltop Mobile Home Park, 914 9th St., Bloomington, Ill. 61704-7437

[21] Appl. No.: 88,119

[22] Filed: Jun. 18, 1993

[51] Int. Cl.⁵ .............................................. H05B 6/64
[52] U.S. Cl. ...................................... 219/725; 219/739; 219/756; 219/717; 99/DIG. 14
[58] Field of Search ................. 219/10.55 E, 10.55 R, 219/10.55 D, 386, 387, 756, 739, 740, 725, 734, 732, 717, 715; 99/451, DIG. 14

[56] References Cited

U.S. PATENT DOCUMENTS

| | | | |
|---|---|---|---|
| 3,515,119 | 6/1970 | Kivela | 219/387 |
| 3,608,627 | 9/1971 | Shevlin | 219/386 |
| 3,751,359 | 6/1988 | Jamieson | 219/10.55 E |
| 3,800,123 | 3/1974 | Maahs | 219/386 |

OTHER PUBLICATIONS

Ad Brochure, *PowerMate*, E. C. Smith & Sons, 1987.
Ad Brochure, Innovation in Marline Products, Peter Schiff Enterprises, 1986.

*Primary Examiner*—Philip H. Leung
*Attorney, Agent, or Firm*—Terry M. Gernstein

[57] ABSTRACT

A unit is suitable for storing and carrying food, and includes a microwave unit therein. The microwave unit is used to heat food and includes a power cord that can be attached to a source of utility power or to a battery. The unit can also include batteries.

1 Claim, 4 Drawing Sheets

COMBINED MICROWAVE UNIT AND FOOD CARRIER

TECHNICAL FIELD OF THE INVENTION

The present invention relates to the general art of food containers, and to the particular field of cooking units.

BACKGROUND OF THE INVENTION

Each day, millions of people carry food in portable containers. Some of this food is taken to school or to work, and some of the food is taken on picnics, camping or on other recreational activities. The food industry has responded to this situation by providing a wide variety of food for meals on the go. Some forms of this food can be eaten cold, while other forms of the food should be heated for maximum enjoyment.

Accordingly, the art includes food heating elements, such as electrical resistance heaters and the like that can be used to heat food. While such food heating elements are somewhat effective, they are often inefficient in performing the heating function, and they also have only one function: to heat food. Therefore, the inefficiencies thereof are exacerbated.

The inventors are not aware of any food heating means that is extremely efficient while also being portable and which can also serve as a reliable food storage container as well.

OBJECTS OF THE INVENTION

It is a main object of the present invention to provide a convenient means to store, transport and heat food.

It is another object of the present invention to provide a convenient means to store, transport and heat food, which can rapidly heat the food.

It is another object of the present invention to provide a convenient means to store, transport and heat food, which uses microwave technology to heat the food.

It is another object of the present invention to provide a convenient means to store, transport and heat food, which uses microwave technology to heat the food, and which can operate from battery power.

It is another object of the present invention to provide a convenient means to store, transport and heat food, which uses microwave technology to heat the food and which can operate from a vehicle battery.

SUMMARY OF THE INVENTION

These, and other, objects are achieved by a food carrier that has microwave circuitry contained therein and insulated walls. The door of the carrier includes seals in order to preserve the freshness of the food stored in the container, and the insulation functions to keep the food stored in the container either cool or warm as desired.

The microwave circuitry includes control buttons as well as mans to connect the magnetron of the microwave unit to a suitable power source. Power sources include rechargeable batteries, vehicle batteries and utility power where available. Suitable compartments are defined in the carrier for storing handles, power cords, batteries, or other accessories.

BRIEF DESCRIPTION OF THE DRAWING FIGURES

DETAILED DESCRIPTION OF THE EMBODIMENT OF THE INVENTION

Figure 1:
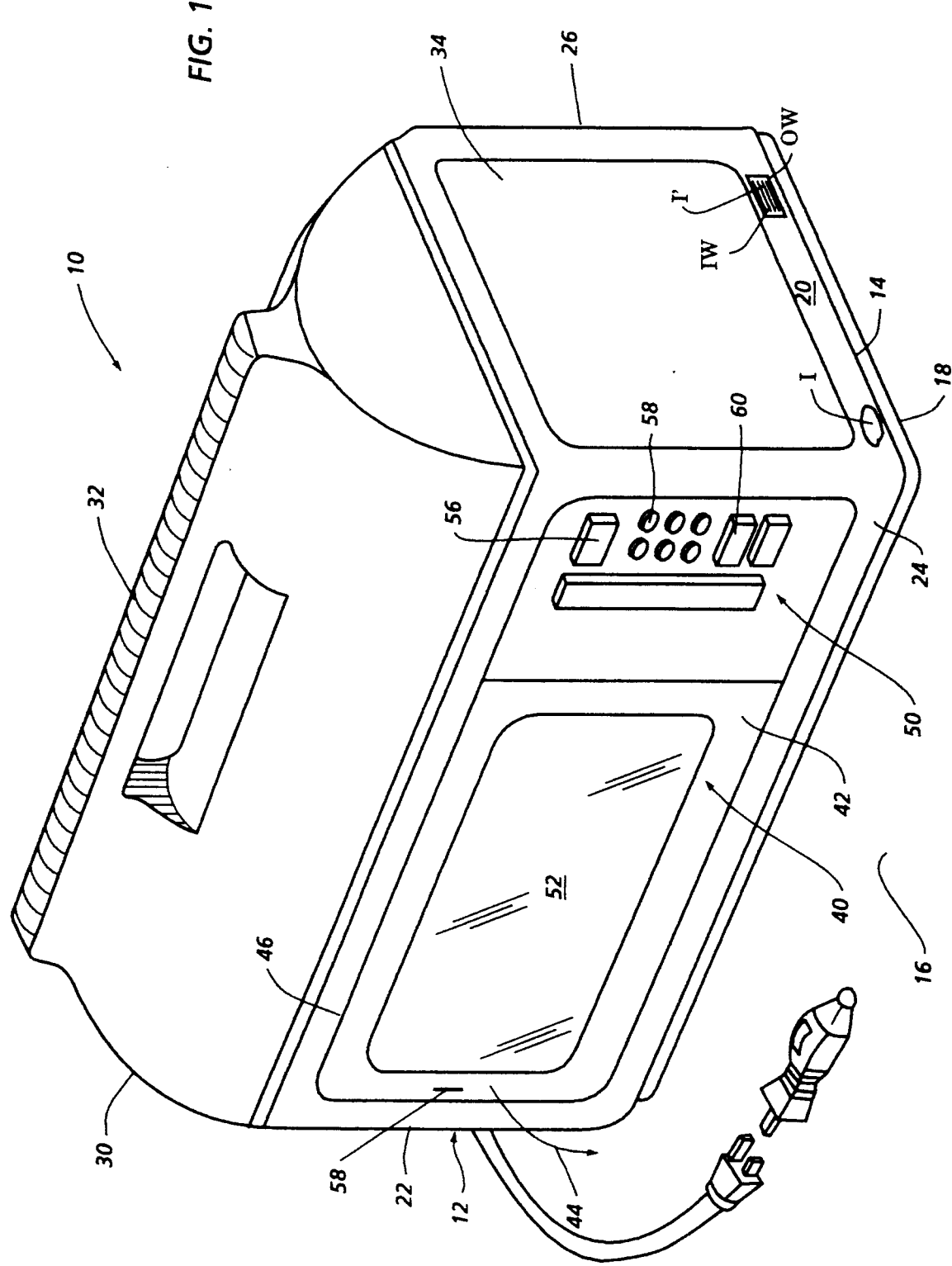
FIG. 1 is an end, front and top perspective view of a preferred form of a combination food carrier and food heater embodying the present invention.

Shown in FIG. 1 is a preferred form of the combination food carrier and food heater 10. The unit 10 includes a base section 12 having a bottom wall 14 that rests on a supporting surface 16 via legs 18 or other such supports. The base unit further includes end walls 20 and 22 connected to the bottom wall and to a front wall 24 and to a rear wall 26. A top section 30 includes a handle 32 by which the unit 10 is carried in the manner of a food container. The top section includes two wings, such as wing 34 that are securely fixed to the base section side walls by fasteners 36.

The walls of the unit 10 are all suitably insulated with materials commonly used to keep food stored in the unit at a desired temperature. If suitable, the walls can be double walls with a vacuum therebetween in the nature of a thermos.

Unit 10 includes a microwave unit 40 in the base section. The microwave unit includes a door 42 connected to the base unit front wall 24 by a hinge (not shown in FIG. 1) so the door will swing outward from the front wall in direction 44 indicated by the arrow in FIG. 1. The door is also sealed completely around its perimeter by a seal 46 so freshness of any food stored in the unit can be protected. The sealing means 46 on the door seals in the manner of a gasket or the like found in refrigerators to seal the door to the front wall in a manner that permits the door to be opened and closed yet prevents air from entering or leaving the base section when the door is closed. A door handle 48 is used to operate the door. Microwave unit operating and control buttons 50 are also mounted on the door 40 as is a viewing window 52. The buttons 50 include the buttons commonly associated with microwave units, such as an on/off button 56 as well as time-setting buttons 58 and power level setting buttons 60.

The control buttons connect the magnetron (not shown, but common to microwave units) to a suitable source of power in the manner common to microwave technology. One source of power includes batteries stored in the unit 10, such as rechargeable batteries or the like. Another source of power is utility power supplied via a power cord connected at one end to the unit 10 and having a suitable plug on the other end thereof. Solar power can also be used if suitable.

Figure 6:
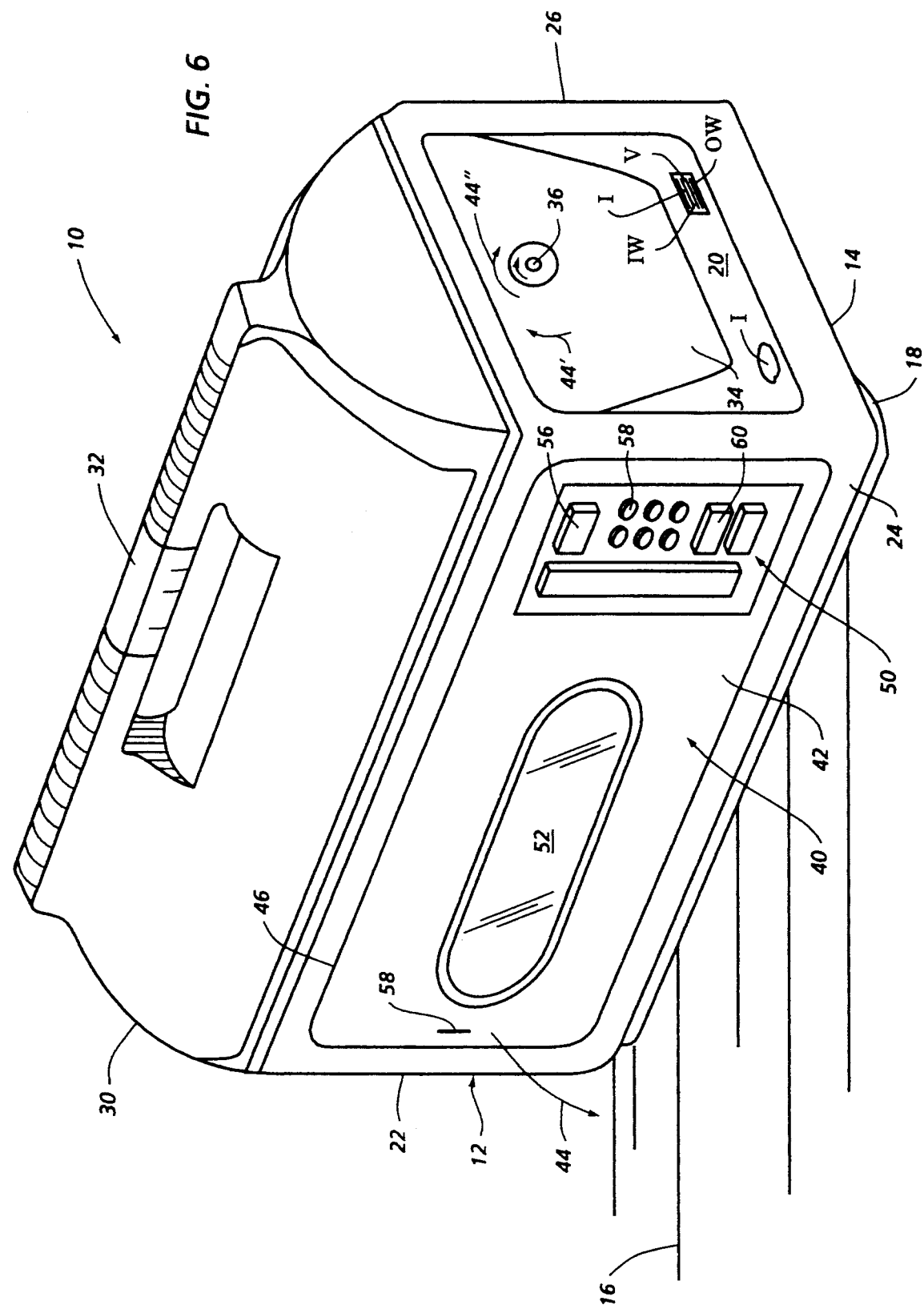
FIG. 6 is an alternative form of the combination food carrier and heater embodying the invention.

An alternative form of the unit 10, unit $10^x$ shown in FIG. 6, includes the microwave door located inside the container and opening upwardly in direction 44'. In such a form, the top section 30 is pivotally connected to the base section to pivot about the fasteners 36 in direction 44″ to expose the inside of the base unit. The microwave door then swings up into this exposed space to open the microwave oven. The viewing window will remain as shown. The magnetron will be located as necessary to accommodate food and the door of the oven.

The walls of the unit can be insulated, as indicated in FIG. 1 at I, or can be double walls with a vacuum therebetween as indicated in section I′ for inner wall IW that defines the inner surface of the unit and an outer wall OW that defines the outer surface of the unit. The inner wall is spaced from the outer wall and a vacuum V is located therebetween.

Figure 2:
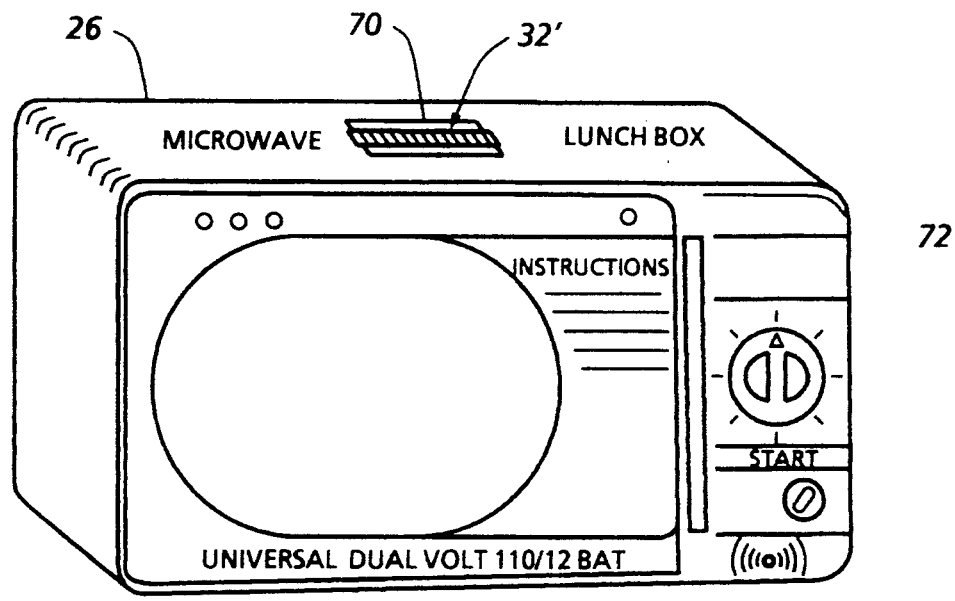
FIG. 2 is an end, front and top perspective view of a second form of a combination food carrier and food heater embodying the present invention.
Figure 3:
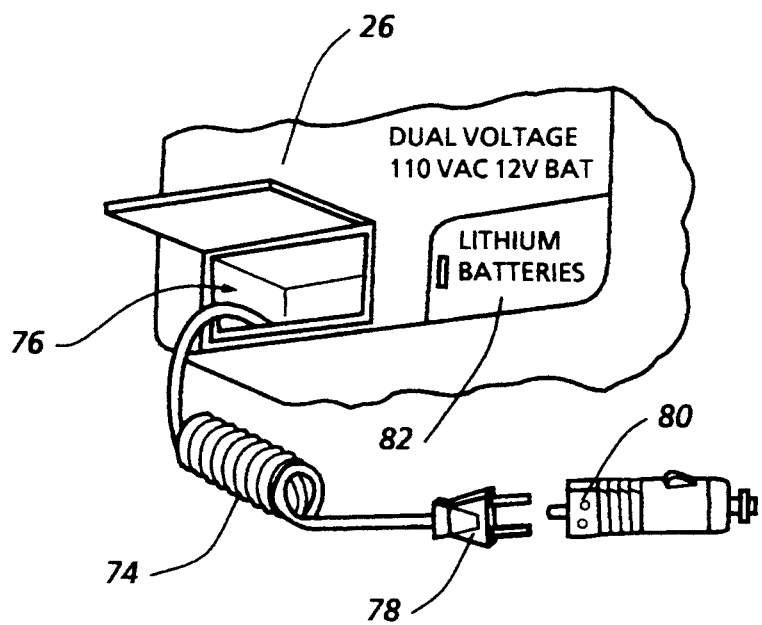
FIG. 3 is a detail view of accessory compartments located on the rear wall of the carrier shown in FIG. 2.

Another form of the unit is shown in FIGS. 2 and 3 as unit 10′. Unit 10′ is similar to unit 10 except that unit 10′ includes a handle 32′ that is collapsible into a handle storing recess 70. Unit 10′ also includes a door operating system that is controlled by bar 72. Shown in FIG. 3 is a power cord 74 that is stored in a cord compartment 76 defined in the rear wall 26 of the unit 10′. Power cord 74 includes a plug 78 on one end and is connected to the unit microwave circuitry at the other end thereof. The plug 78 can connect to a source of utility power via a wall socket, or can connect to an adapter 80 that is plugged into another outlet, such as a cigarette lighter on a motor vehicle. A battery compartment 82 is also defined in the base section of the unit and stores batteries, such as rechargeable batteries, or the like.

Figure 4:
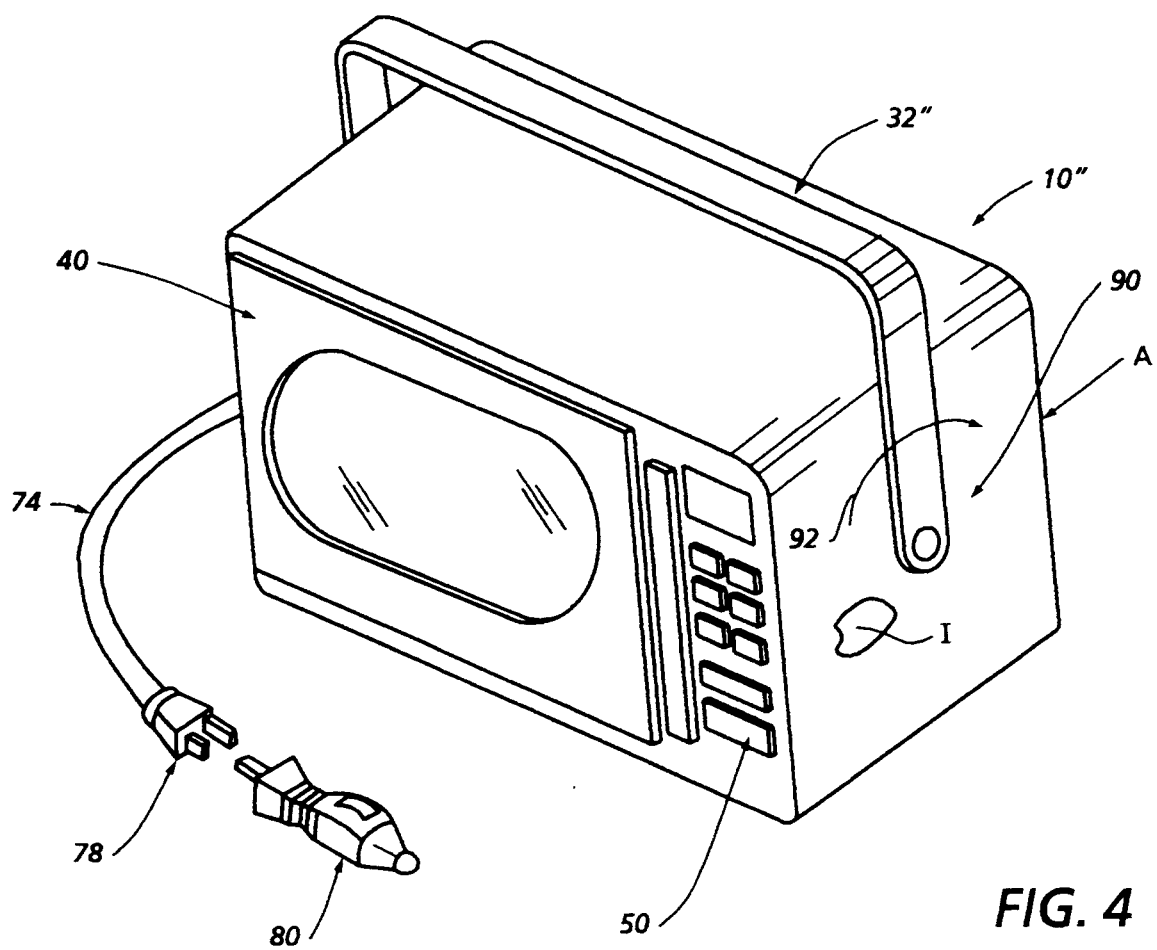
FIG. 4 is an end, front and top perspective view of a third form of a combination food carrier and food heater embodying the present invention.
Figure 5:
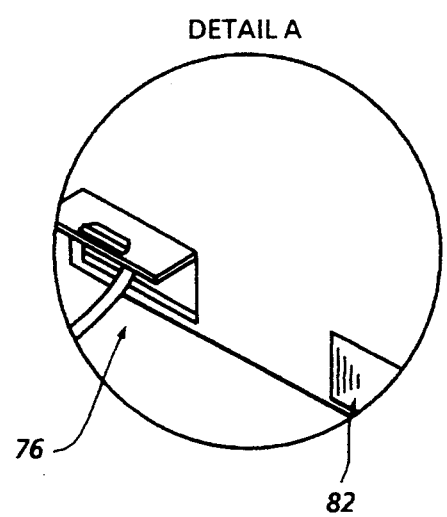
FIG. 5 is a detail view of accessory compartments located on the rear wall of the carrier shown in FIG. 4.

Yet another form of the unit is shown in FIGS. 4 and 5 as unit 10″. Unit 10″ is similar to units 10 and 10′ with the exception of handle 32″. Handle 32″ is connected to the base section by pivot pins 90, and moves from the upright, carrying position shown in FIG. 4 to a stored, out-of-the-way position by pivoting in direction 92 about pin 90. Unit 10″ also includes a door 40, operating buttons 50, a power cord 74, a plug 78 and an adapter 80. Unit 10″ also includes suitable storage compartments, such as cord storage compartment 76 and battery storage compartment 82 on the rear wall thereof.

It is understood that while certain forms of the present invention have been illustrated and described herein, it is not to be limited to the specific forms or arrangements of parts described and shown.

We claim:

1. A combined microwave unit and food carrier comprising:
   A) a housing that includes a base section having insulation therein, a top section fixed to said base section, a handle fixed to said top section, pivot pins pivotally connecting said handle to said base section, said base section including two end walls, a front wall, a rear wall, and a bottom wall, said top section including a handle storage compartment for storing said handle; and
   B) a microwave unit in said base section and including
      (1) a door in said front wall,
      (2) a viewing window in said door,
      (3) sealing means on said door sealing said door to said front wall in a manner that permits said door to be opened and closed yet prevents air from entering or leaving said base section when said door is closed,
      (4) control buttons on said front wall,
      (5) microwave circuitry in said base section connecting said control buttons to a magnetron in said base section to a source of power, and a power cord connected to said microwave circuitry,
      (6) rechargeable batteries contained in a battery compartment in said base section, and
      (7) a power adapter means for connecting said power cord to a motor vehicle battery, said power adapter means including means for establishing electrical connection with a cigarette lighter on a motor vehicle.

* * * * *